SIGNAL-TO-NOISE SQUELCH CIRCUIT

Filed Oct. 24, 1962

INVENTOR.
ALDIS KURVITS
BY
T. L. Styner
ATTORNEY

United States Patent Office 3,213,372
Patented Oct. 19, 1965

3,213,372

SIGNAL-TO-NOISE SQUELCH CIRCUIT

Aldis Kurvits, Penfield, N.Y., assignor to General Dynamics Corporation, Rochester, N.Y., a corporation of Delaware Filed Oct. 24, 1962, Ser. No. 232,760
4 Claims. (Cl. 325—478)

This invention relates to squelch circuits and is particularly directed to means for open-circuiting a signal channel in response to a predetermined signal-to-noise ratio in the channel.

An object of this invention is to provide an improved squelch circuit which is simple in construction and reliable in operation.

More specifically, an object of this invention is to provide a squelch circuit which will interrupt or open-circuit the signal channel in response to a controllable ratio of root-mean-square signal voltage to root-mean-square noise voltage.

Another object of this invention is to provide a squelch circuit which has a fast attack-slow release time characteristic.

The objects of this invention are attained by means for separately detecting and integrating two different portions of the band of frequencies being transmitted, one portion containing signal voltages of characteristic amplitude, while the other portion contains essentially only noise voltages. Most of the power in voice-type signals, for example, is concentrated in the relatively low frequency portion of the voice band. That is, most of the power will be found in the range below about 600 cycles per second, while the power content of frequencies above 2300 c.p.s. is usually at least 20 db down. Noise level, however, in the audio band, because of internal and external sources of noise, is essentially constant. By detecting, integrating and comparing the voltages of these two portions of the pass band, information is obtained for appropriately operating a signal squelch gate in the signal channel.

Other objects and features of this invention will become apparent to those skilled in the art by referring to the specific embodiments of the invention described below and shown in the accompanying drawing, in which.

Figure 1:
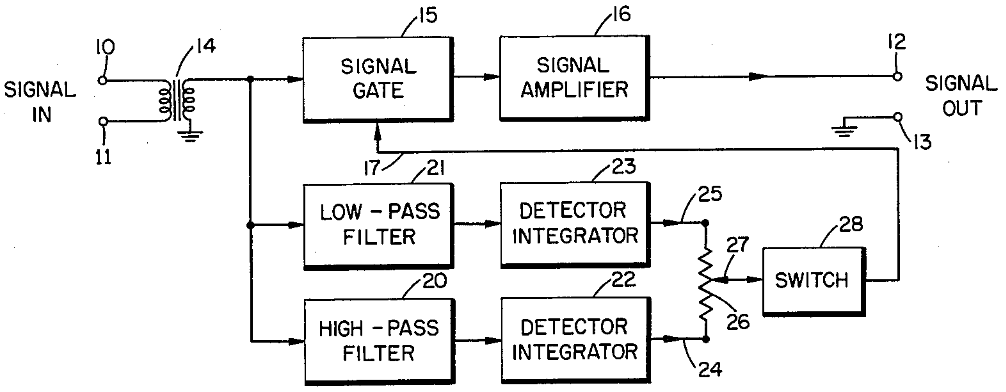
FIG. 1 is a block diagram of one embodiment of this invention.

In FIG. 1 is shown a signal channel into which is fed a signal from terminals 10 and 11, and provides signals at an output comprising terminals 12 and 13. By "signal" is meant any electrical intelligence which may be accompanied by noise voltages of random frequencies and amplitudes. The most useful portions of conventional voice signals generally are in the 100 to 7000 c.p.s. range. It will be apparent as the description proceeds that the invention is not limited to these specific signal frequencies. In FIG. 1 the signal is coupled through transformer 14 to the input of signal gate 15, which can be opened to interrupt the signal or closed to pass the signal unattenuated to the amplifier 16 and to the output circuit 12–13. Line 17 applies to the gate 15 a voltage of either of two values which will open or close, respectively, the gate.

The incoming signal is applied in multiple to filters 20 and 21, the filters being adjusted to pass different portions of the band of frequencies received at input terminals 10 and 11. Where the signal is from a microphone, for example, filter 20 is adjusted to pass frequencies above, say, 2300 c.p.s. Alternatively, filter 20 may be of the band-pass type through which frequencies between 2300 and 3000 c.p.s. will pass. Filter 21, on the other hand, is of the low-pass type, having a cutoff at about 900 c.p.s. Again, filter 21 may be of the band-pass type, if desired, to pass a limited band between, say 300 and 900 c.p.s. When there is no audio signal present, the noise voltages produce about equal voltages at the output terminals of filters 20 and 21; but, when a signal arrives, the output terminal voltage of filter 21 materially increases.

Detector-integrators 22 and 23 are connected, respectively, in the outputs of filters 20 and 21, to detect and integrate all frequencies passed by each filter and to produce at terminals 24 and 25 direct current voltages which are representative of the energy content of the respective pass bands. These direct current voltages are compared in the comparator 26. Conveniently, the comparator may comprise an elementary potentiometer with the end terminals connected to terminals 24 and 25 and with the adjustable contact 57 movable throughout the length of the resistance. When the voltages at terminals 24 and 25 are equal, as when noise voltages only are received and detected, the midpoint of the potentiometer will stand at some predetermined voltage with respect to ground; and when the voltage at terminal 25 changes in response to voice signals, the midpoint voltage changes characteristically. This characteristic voltage is employed to operate switch mechanism 28 which, in turn, operates through line 17 the gate 15. As will appear in the treatment of specific circuits below, switch 28 normally holds open gate 15 when no audio signal is present and closes gate 15 when an audio signal is received. Further, the switch 28 and gate 15 respond immediately when the audio signal first appears but will "hang" for a predetermined time after the last audio signal is received.

Figure 2:
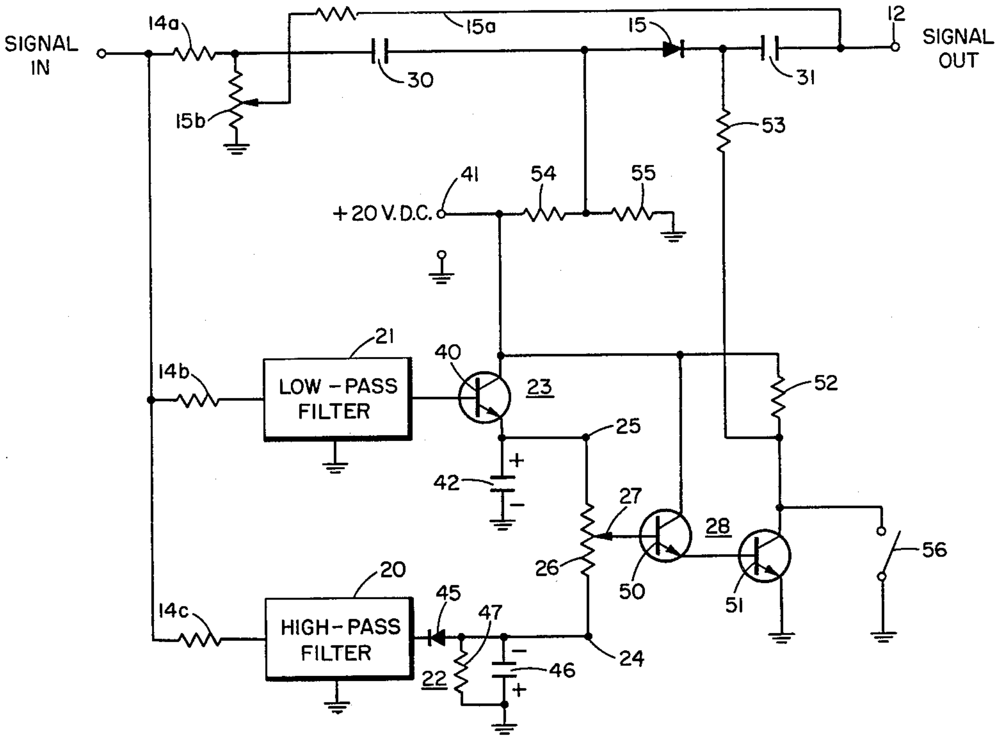
FIG. 2 is a circuit diagram of the system shown in FIG. 1.

FIG. 2 shows specific implementation of the system of FIG. 1, where like reference numbers indicate corresponding elements. The particular gate 15 shown in FIG. 2 comprises a simple diode which has low forward impedance when forwardly biased and has very high impedance when not biased or when reverse biased. Blocking condensers 30 and 31 couple gate 15 in series in the signal channel and at the same time permits the application of direct current biasing potentials to the terminals of the rectifier without impeding or shunting the signal channel.

In the specific example shown, detector 23 comprises the transistor 40 of the NPN type with the collector connected to the D.C. power source with terminal 41 and the emitter connected to the integrating condenser 42 as well as to the comparator terminal 25. The base of transistor 40 is connected to the output of the low-pass filter 21. With no positive voltage applied to base 40, the transistor remains cut-off. When filter 21 passes a signal, transistor 40 conducts. Saturation current increases the voltage at terminal 25 in a positive direction to a voltage near the positive voltage at terminal 41. The voltage at terminal 25 will stand at some intermediate value when noise voltages only are received and will rise sharply to some high positive voltage near the voltage of terminal 41 when a signal plus a noise voltage is received.

Detector 22 comprises rectifier 45 connected between the output of filter 20 and terminal 24 of the comparator. Integrating condenser 46 averages the rectified signal. Resistor 47 across condenser 46 adjusts the time constant of condenser 46 to some value less than the time constant of integrating condenser 42.

The switch circuit 28 comprises, in this example, the two cascaded transistors 50 and 51, both of the NPN type and both with the emitter-collector circuits connected across the D.C. source at 41. Load resistor 52 is connected in the collector circuit of transistor 51, and the collector of that transistor is connected to one terminal of diodes 15 through coupling resistor 53. The other terminal of diode 15 is connected to an intermediate point of the voltage divider including resistors 54 and 55 across the D.C. source 41. Transistor 51 is normally cut-off, and rectifier 15 is normally back biased.

In operation, the presence of voice signals in a composite incoming signal causes more energy to be passed through the low-pass filter 21 than through the filter 20 and therefore causes a higher positive D.C. output from transistor 40 than from rectifier 45. The negative noise reference voltage from rectifier 45 remains essentially unchanged, and results in a more positive voltage at the base of transistor 50 than at the base of transistor 51. Transistors 50 and 51 are switched into saturation. This removes the back-bias on the squelch gate diode 15, permitting unattenuated passage of signals to the output terminal 12. The voice-to-noise ratio at which unsquelching occurs can be adjusted by moving contact 27 of the comparator-potentiometer.

If desired, the squelch circuit can be disabled by grounding the collector of transistor 51 through the on-off grounding switch 56. Further, the gate 15 and the squelch function may, if desired, be by-passed by the line 15*a*. One end of the line may be connected to the sliding contact of the potentiometer 15*b* across the signal channel to vary the amount of signal energy passed around the gate. Isolation resistors 14*a*, 14*b* and 14*c*, respectively, are connected in the signal channel and in circuit with the filters 21 and 20.

Fast squelch attack time is assured by high charging current to condenser 42 through the transistor 40. This attack time may easily be made of the order of ten microseconds. However, the hang time or elapse time between removal of the voice input and the opening of the squelch gate 15 is determined by the time constant of condenser 42 and the resistances 26 and 47. This hang time is also proportional to $S+N/N$ of the incoming signal, inasmuch as the voltages across the comparator depend upon the signal S and the noise N at terminal 25 and the noise voltage N at terminal 24.

In most applications, the 300 to 900 c.p.s. band-pass filter may be replaced with a low-pass filter cutting off at 900 c.p.s. The circuits of FIG. 2 are of particular value in controlling the loudspeaker circuit of a single sideband receiver where the carrier may be suppressed and where the voice signals may be received in bursts. In such applications, it is important that noise in the absence of useful signals in the loudspeaker be squelched. It is important also that the gate be closed and the speaker energized immediately upon receipt of the first signal and that the gate remain closed for a predetermined time after cessation of voice signals to permit normal pauses in voice signals.

Many modifications may be made in the specific circuit details of this invention without departing from the scope of the invention as defined in the appended claims.

What is claimed is:

1. A squelch circuit for a signal channel connected between a signal source and a load, said channel comprising a controlled gate in series with the signal channel, a first filter and a first integrator connected to said channel for selecting and integrating that portion of the channel signal voltages having an energy level which is characteristic of the useful signal being transmitted, a second filter and a second integrator connected to said channel for selecting and integrating that portion of the channel signal voltage having an energy level which is characteristic of noise only being transmitted, means for comparing the two integrated voltages, said first integrator having a shorter charging and a longer discharging time constant than said second integrator, and means for opening and closing said gate, respectively, in response to predominance of one integrated voltage over the other.

2. A squelch circuit for a signal channel comprising a controlled gate in series with the signal channel, a first filter and a first integrator connected to said channel for selecting and integrating a portion of the signal voltage, a second filter and a second integrator connected to said channel for selecting and integrating a portion of the noise voltage in said channel, said first integrator comprising a capacitor, said second integrator comprising a capacitor shunted by a resistor, means for comparing the two integrated voltages, said comparing means comprising a resistor connected between said capacitors, and means for closing said gate in response to a predetermined ratio of signal-to-noise voltages.

3. A squelch circuit comprising a controlled gate in series with the signal channel, two filters connected to said channel adapted, respectively, to pass different frequency portions of the incoming signal, a pair of means for separately integrating the two pass bands, one of said pair comprising a transistor having a capacitor in its emitter-collector circuit and the other of said pair comprising a resistor-capacitor circuit, said one of said pair having a shorter charging time constant and a longer discharging time constant than said other of said pair, means for comparing the two integrated voltages, and switch means responsive to the comparator connected to said gate for operating said gate.

4. A squelch circuit comprising a gate connected in series in the signal channel, a first filter connected to said channel for selectively passing only signal frequencies having high energy content, means connected to said first filter for generating a voltage proportional to said energy content including a transistor amplifier having a capacitor connected between its emitter and ground, a second filter for selectively passing frequencies which are predominantly noise and excluding said signal frequencies, means connected to said second filter for generating a direct current voltage proportional to the noise voltages including a unidirectional current conduction device having a resistor-capacitor circuit connected between said device and ground, a comparator for comparing said two voltages, said comparator being a potentiometer having a tap and having its ends connected one to said emitter and the other to the junction of said device and ground and means connected to said tap for opening said gate in response to a predetermined ratio of signal and noise voltages.

References Cited by the Examiner

UNITED STATES PATENTS

| | | | |
|---|---|---|---|
| 2,343,115 | 2/44 | Noble | 325—348 |
| 2,802,939 | 8/57 | Klehfoth | 325—478 |
| 2,852,622 | 9/58 | Fedde | 325—478 |
| 3,102,236 | 8/63 | Eichenberger | 325—478 |

DAVID G. REDINBAUGH, *Primary Examiner.*